United States Patent Office.

JOHN STOWELL, OF CHARLESTOWN, MASSACHUSETTS.

Letters Patent No. 96,994, dated November 16, 1869.

IMPROVED BAKING-POWDER.

The Schedule referred to in these Letters Patent and making part of the same.

*To all whom it may concern:*

Be it known that I, JOHN STOWELL, of Charlestown, in the State of Massachusetts, have invented an Improvement in Raising Bread, and in the Preparation of Powders for Raising Bread.

My invention consists in mixing with the flour and water of which bread is to be made, an alkaline carbonate and bitartrate of ammonia.

Hitherto cream of tartar has been almost universally used to disengage from alkaline carbonates, used in bread-making, the carbonic acid by which the bread is raised.

But in the use of cream of tartar, argols, or crude tartar, there is a great waste of tartaric acid. This is because the bases of the alkaline carbonates and of bicarbonate of potassa, commonly known as cream of tartar, are the same, or have equal affinity for tartaric acid.

When the bitartrate of potassa is chemically combined with carbonate of potassa or bicarbonate of potassa, one-half the tartaric acid is employed in holding the potassa with which it was originally combined, and only one-half is at liberty to unite with the potassa of the carbonate or bicarbonate, and set free their carbonic acid.

In the same manner, only one-half the tartaric acid contained in cream of tartar will leave its potassa to unite with soda, when soda is the base of the alkaline carbonate employed; and not only is one-half of the tartaric acid of no use for the purpose intended, but it helps to form in the bread a large quantity of useless and objectionable salt.

The supply of cream of tartar, or argols, or crude tartar, is already limited, and the production cannot be much increased, as the chief and almost only source is a small deposit from a large quantity of wine. It is, therefore, necessary to make the supply available as far as possible. This is the object of my invention.

The same amount of tartaric acid, used in the form of bitartrate of ammonia, will go twice as far, for the purpose of bread-raising, as when used in the form of cream of tartar.

The tartaric acid of cream of tartar, argols, or crude tartar can readily be combined with ammonia, in the form of bitartrate of ammonia.

It is not a part of my invention to prepare the bitartrate of ammonia, but I take it, when prepared, and use it with alkaline carbonates, in making bread.

For an alkaline carbonate I very much prefer the bicarbonate of soda.

Bitartrate of ammonia is composed of two equivalents of tartaric acid and one equivalent of ammonia, soda and potassa having a stronger affinity for tartaric acid than ammonia has, and a stronger affinity for it than for carbonic acid, as much of their alkaline carbonates can be mixed with a given quantity of the bitartrate of ammonia, as would be required to neutralize all the tartaric acid contained therein.

In practice, the proportions are about one hundred and sixty parts, by weight, of the bitartrate of ammonia to one hundred and fifty parts of bicarbonate of soda, varying a little, according to the purity of the articles.

The proportions to be taken when other carbonates are used will be determined by the chemical equivalents of the constituents of the substances.

I accordingly add bitartrate of ammonia and an alkaline carbonate, in these proportions, to the flour and water, when the latter are stirred together to make dough.

The moisture immediately occasions a decomposition, which is greatly assisted by the application of heat, the tartaric acid of the bitartrate of ammonia uniting with the alkaline base of the carbonate, and setting free carbonic-acid gas, by which the bread is raised.

Ammonia is also set free, and being volatile, assists in raising the bread.

The resulting salt is tartrate of soda, which is left in the bread, but in much less quantity than when cream of tartar is used.

I sometimes use bitartrate of ammonia with the bicarbonate of the volatile alkali, but in this case only one-half of the carbonate acid of the alkaline carbonate is set free. The remaining carbonate, however, upon the application of heat, as is well known, is useful by itself for raising bread.

The bitartrate of ammonia and an alkaline carbonate may be mixed together, in the above proportions, as a baking-powder, and kept ready for use.

The powder is added to the flour and water when the latter are stirred together to make dough.

I claim—

1. The use of bitartrate of ammonia, with an alkaline carbonate, substantially as described, for the purpose of raising bread.

2. A baking-powder, made up of bitartrate of ammonia and an alkaline carbonate, substantially as above described.

The above specification of my said invention signed and witnessed at Boston, this 11th day of May, 1869.

JOHN STOWELL.

Witnesses:
 W. W. SWAN,
 H. FARNAM SMITH.